2,913,457
5β-PREGN-1-ENE-3,20-DIONE AND 20-KETALS THEREOF

Gunther S. Fonken, Kalamazoo, and Herbert C. Murray, Barry Township, Barry County, Mich., assignors to The Upjohn Company, Kalamazoo, Mich., a corporation of Delaware No Drawing. Original application May 1, 1959, Serial No. 810,233. Divided and this application July 9, 1959, Serial No. 825,883

3 Claims. (Cl. 260—239.55)

This invention relates to certain novel steroids, more particularly 5β-pregn-1-ene-3,11,20-trione and the 20-ketals thereof represented by the formula:

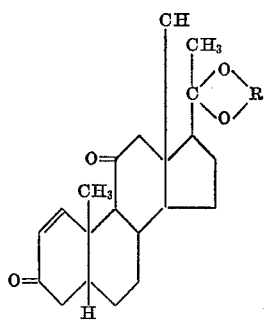

wherein R is lower-alkylene containing from 2 to 8 carbon atoms and from 2 to 3 carbon atoms in the chain, e.g., ethylene, 1-methylethylene, propylene, 1-methylpropylene, 2,2-dimethylpropylene, 1-ethylethylene, 1-propylethylene, 1-butylethylene, 1-amylethylene. Especially preferred are the 20-ethylene ketals.

5β-pregn-1-ene-3,11,20-trione possesses useful pharmacological properties, including central nervous system depressant activity, rendering the compound useful as an anesthetic, e.g., during the manipulation of and experimentation with laboratory animals including rabbits, mice and rats. Administration can be by the usual dosage forms, including pills, tablets, capsules, syrups or elixirs for oral use, or in the known liquid forms which are adaptable for injection.

The following preparations and example are illustrative of the products of the present invention, but are not to be construed as limiting.

PREPARATION 1

Pregnenolone 20-ethylene ketal

A mixture of 10 g. of pregnenolone, 20 ml. of ethylene glycol, 0.5 g. of p-toluenesulfonic acid monohydrate and 250 ml. of benzene was refluxed with stirring for about 7 hours, using a Dean-Stark water trap. The cooled mixture was washed with aqueous sodium bicarbonate after dissolving precipitated steroid with methanol. The separated benzene layer was evaporated until only methanol remained and the resulting slurry was filtered to give 12.3 g of pregnenolone 20-ethylene ketal which was recrystallized from acetone containing a trace of pyridine to give crystals melting at 167–170° C.

PREPARATION 2

5β-pregnane-3,11,20-trione 20-ethylene ketal 100 g. of 3α-hydroxy-5β-pregnane-11,20-dione was converted to the corresponding 20-ethylene ketal in the manner described in Preparation 1.

75.5 g. of the thus-produced 3α-hydroxy-5β-pregnane-11,20-dione 20-ethylene ketal was dissolved in 100 ml. of pyridine, diluted with 2,000 ml. of tertiary butyl alcohol, and stirred overnight at room temperature with 41.3 g. of N-bromoacetamide. A solution of 25 g. of sodium sulfite in 350 ml. of water was added and the solution evaporated at reduced pressure until most of the tertiary butyl alcohol was removed. The resulting precipitate was filtered and the cake washed with aqueous sodium bicarbonate, with water and then dried. The thus-obtained 5β-pregnane-3,11,20-trione 20-ethylene ketal was recrystallized from a mixture of acetone and hexanes (Skellysolve B) to give crystals melting at 150–153° C.

EXAMPLE 1

5β-pregn-1-ene-3,11,20-trione and 20-ethylene ketal 10 l. of medium consisting of 1% dextrose (Cerelose) and 2% corn steep liquor of 60% solids, was adjusted to pH 4.9 with sodium hydroxide. 1 ml. of silicon oil anti-foaming agent (Dow-Corning XC–120) was added. The medium was steam sterilized at 20 lbs. pressure for 90 minutes at 120° C. Upon cooling, the sterile medium was inoculated with a 72-hour growth, from spores, of Septomyxa affinis (ATCC 6737). The medium was agitated, and sparged with sterile air at the rate of 0.5 l. of air per minute. After culturing at room temperature for 48 hours at 28° C., the pH was 7.5. To this 48-hour culture there was added 2.0 g. of pregnane-3,11,20-trione 20-ethylene ketal plus 50 mg. of 3-ketobisnor-4-cholen-22-aldehyde as a conversion assistant in 30 ml. of N,N-dimethylformamide. The flask was rinsed with 10 m. of acetone which was also added to the medium. Fermentation of the steroid was maintained for 48 hours, at the end of which time the pH was 8.15. The fermentation broth was strained through gauze to separate the mycelium. The filtrate was extracted with methylene chloride. The methylene chloride extracts were distilled under reduced pressure to a volume of about 1 l. and evaporated in air. The residual solids were chromatographed through a 2.8 x 36 cm. column of magnesium silicate (Florisil). Hexanes (Skellysolve B) plus 5% acetone eluted 5β-pregn-1-ene-3,11,20-trione 20-ethylene ketal which was recrystallized from a mixture of hexanes and acetone to give 0.87 g. of crystals melting at 204–206° C., having a $$\lambda_{max}^{EtOH} \ 225 \ m\mu; \ a_M \ 8800$$

A solution of 0.50 g. of 5β-pregn-1-ene-3,11,20-trione 20-ethylene ketal in 25 ml. of methanol was hydrolyzed by the addition of 5 ml. of N-hydrochloric acid and permitting the reaction mixture to stand at room temperature for several hours. The hydrolyzed solution was concentrated to a small volume and cooled, whereupon crystals of 5β-pregn-1-ene-3,11,20-trione formed and were separated by filtration. The compound has a melting point of 152–162° C.

This application is a division of our application 810,233, filed May 1, 1959.

We claim:

1. A compound represented by the formula:

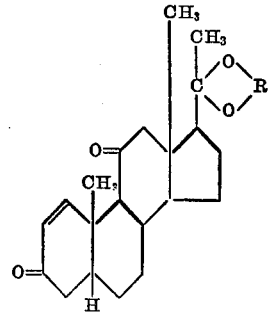

wherein R is lower-alkylene containing from 2 to 8 carbon atoms and from 2 to 3 carbon atoms in the chain.
2. 5β-pregn-1-ene-3,11,20-trione 20-ethylene ketal.
3. 5β-pregn-1-ene-3,11,20-trione.

No references cited.